June 9, 1931. G. A. SQUIER 1,809,494
MOUNTING FOR OPHTHALMIC LENSES
Filed May 9, 1930
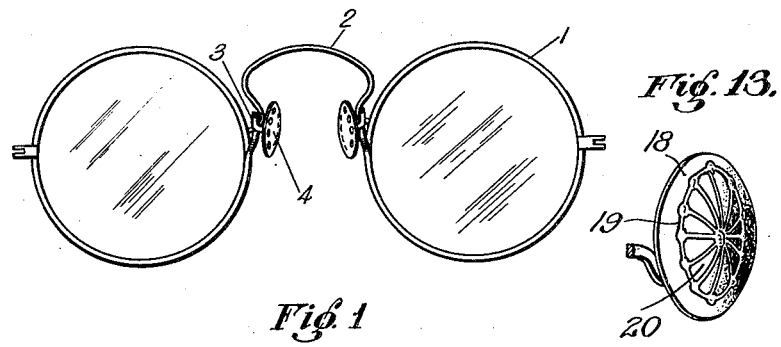
Fig. 1. Fig. 13.
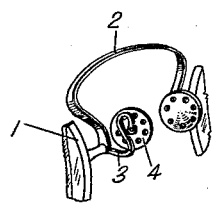 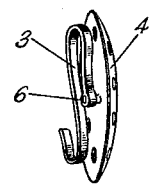  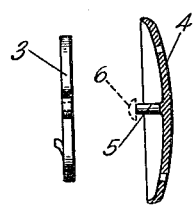
Fig. 2. Fig. 3. Fig. 4. Fig. 5.
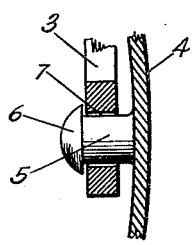 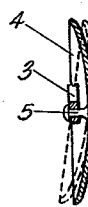 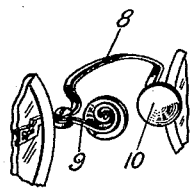
Fig. 6. Fig. 7. Fig. 8. Fig. 12.
Fig. 11.
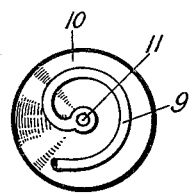 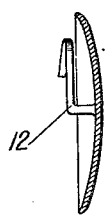 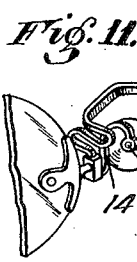 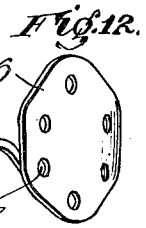
Fig. 9. Fig. 10.
INVENTOR.
George A. Squier.
BY Edwin P. Carter
ATTORNEY Patented June 9, 1931

1,809,494

UNITED STATES PATENT OFFICE

GEORGE A. SQUIER, OF CLEVELAND, OHIO

MOUNTING FOR OPHTHALMIC LENSES

Application filed May 9, 1930. Serial No. 450,932.

My invention relates to mountings for ophthalmic lenses. It has for its purpose the provision of a means for holding such lenses in place before the eyes by means of contact with the nose. It is suitable for spectacles, nose glasses, lorgnettes and the like, being especially effective with nose glasses. It may be used with either rimless or framed structures.

Heretofore, workers in the art have made their guards so as to produce a pinching pressure near the top of the nose, thus imbedding that part of the guard in the soft flesh. These parts were made comparatively small so as to sink more easily into the flesh. The pressure was then adjusted so that a certain amount of the flesh was gathered into a fold just beyond the points of pressure. This acted as a resistance to pulling the guards forward from the face. The balance of the guard was designed to rest upon the side of the nose on the more rigid part thereof. In other words, the lower parts of the guards were designed to straddle the lower part of the nose in order to bear the weight of the lenses while the upper part squeezed the soft flesh in front of it so as to prevent the mounting with its lenses from tipping forward.

Naturally the variety of guards required to fit the various shapes of noses was great. Not only that, but they were faulty in that frequently the excessive pressure concentrated on the small areas of the upper parts produced sores or inflammations. Furthermore, the principle of gathering a fold of flesh in front of the pressure points to prevent slippage presupposes attachment at a soft pliable part of the nose. This tends to make the whole mounting unstable and wabbly with consequent discomfort to the wearer.

One of the objects of my invention is to provide a structure of the type indicated which will hold the lenses firmly in proper relation to the eyes without necessitating so great a surface pressure upon the nose as has previously been required.

Another object of my invention is to provide a means for so holding the lenses in proper position by means of guards which exert their pressure practically entirely upon that part of the nose which may be termed the fleshy portion and which may be technically referred to as the superior lateral aspect of the nasal bone above the anterior lachrymal crest, thus dispensing practically entirely with the always undesirable application of pressure to the more bony structure beneath this fleshy portion.

Another object of my invention is to provide a novel type of guard which will automatically accommodate itself to the nose without the necessity of bending this guard in the usually unsuccessful attempt to fit the angles of the nose.

There are other objects of my invention which are important but which will appear more clearly in conjunction with the following detailed description of the invention.

My invention preferably takes the form of a mounting embodying guards whose nose-contacting surfaces are substantially convex, so that such pressure as these surfaces apply to the nose is mainly applied at the center of such surfaces while the pressure gradually decreases in all directions outward from this center. In this preferred form, the guards are of inherently-rigid construction so that they not only do not require bending to fit the nose but are obviously not intended to be so bent. Furthermore, these are carried in such relative positions upon the mounting that they will naturally assume positions upon the so-called fleshy portion of the nose previously referred to and not upon the bony portion thereof. In addition, my guards are preferably so mounted upon their supports that they will be free to both wabble and rotate to accommodate themselves to the angles of any particular nose, the uniform curvature of their contacting surfaces causing them to exert the same pressure upon the nose in any position to which they may wabble or rotate.

The preferred embodiment of my invention is shown in the accompanying drawings wherein similar characters of reference designate corresponding parts and wherein:

Figure 1 is a rear elevation of a pair of eye glasses with my invention applied thereto.

Figure 2 is a detail in perspective illustrating my preferred form of guards and supporting arms therefor, the perspective being taken from such an angle that the rear surface of one guard is shown in the foreground while the front surface of the other guard is also shown.

Figure 3 is a perspective view of my preferred type of pad and supporting arm shown enlarged.

Figure 4 is a detail view and side elevation of my preferred type of guard supporting arm.

Figure 5 is an edge view of my guard supporting arm and guard in disassembled relation.

Figure 6 is an enlarged detail view illustrating the manner in which my guard is loosely mounted upon its supporting arm so as to leave it free to wabble or rotate therein.

Figure 7 is an edge view of my guard mounted upon its supporting arm, the wabbling capability of this structure being illustrated by dotted line representations.

Figure 8 is a perspective view of a finger-piece mounting with my guards of slightly modified form and carried by slightly modified arms.

Figure 9 is a rear elevation of one of the guards and supporting arms therefor such as shown in Figure 8.

Figure 10 is a vertical section of a modified form of my invention.

Figure 11 is a perspective view illustrating my device applied to a rimless spectacle structure.

Figure 12 is a perspective view illustrating a modified type of guard which I may use.

Figure 13 is a perspective view of a further modified form of guard.

In the drawings, with particular reference to Figures 1 to 7, inclusive, my invention is shown applied upon a pair of spectacles embodying eye wires 1 and a bridge piece 2. It will be obvious that it may be applied to nose glasses of any form.

This invention embodies supporting arms 3 which are preferably of S form. In the preferred construction, these S arms 3 are vertically mounted in a plane substantially perpendicular to the bridge member 2, although this position may be altered as desired. The free ends of the arm may be adjusted towards or away from the shank of the arm or they may be adjusted laterally and individually in any preferred manner.

My preferred form of guard is designated 4 and is preferably provided with a comparatively large nose-contacting surface of circular form. This nose-contacting surface is convex in form with the highest point in the center thereof, being curved in all directions outwardly from this central point to the same extent.

In the form shown in these particular figures, the guard is provided with perforations extending entirely through from one side to the other thereof. These perforations permit the access of air to the pores of the skin beneath the contacting surface of the guard and, therefore, tend to prevent the nose from becoming sore because of pressure by the guard.

Each guard is preferably provided upon its rear surface with a pin 5 having a head 6. This pin is preferably disposed within an aperture 7 in the supporting arm 3. Both the pin and the opening through which it extends in the supporting arm are cylindrical in form so that free rotation will be permitted. One advantage arising from this rotative mounting is the elimination of uneven wear of the pin and the arm. Furthermore, there is a substantial clearance between the pin 5 and the walls of the opening 7 so that the guard will be free to adequately wabble upon the supporting arm to accommodate itself to the particular nose structure being fitted. This wabbling action is illustrated in Figure 7.

In Figure 8, my invention is shown applied to finger piece nose glasses. In this form, the bridge is shown at 8. Mounted upon this structure is a supporting arm 9 which may be of spiral form as shown. This supporting arm 9 is preferably provided with an opening for the reception of a pin as shown in Figure 9. Likewise, in this structure, the guard is of circular form as at 10 and it will be noted that it is devoid of perforations. It is preferably provided with a pin 11 on its rear surface which is designed to be mounted in an opening in the end of the supporting arm in a manner substantially identical with the manner of mounting shown in Figures 1 to 7, inclusive.

A further modified form of my invention is illustrated in Figure 10. In this figure, the guard is of substantially identical form with that shown in Figures 8 and 9 with the exception that it is integrally connected to the supporting arm 12. This supporting arm 12 may be of any preferred form.

In the form shown in Figure 11, the guards 13 are shown mounted upon supporting arms 14. These arms 14 are of somewhat different structure but they are apertured at their ends for the reception of the guards. In this structure, the guards 13 carry pins 15 which are rotatable in the openings which receive them and are also loosely fitted to permit adequate wabbling action.

In Figure 12, I have shown a modified shape of guard. This guard, which may be designated 16 is hexagonal and is provided with a plurality of apertures 17 therein. It will be understood that the shape of the guard, as far as the exterior contour thereof may be either hexagonal, heptagonal, octagonal, nonagonal, decagonal or of any other desired form. An oval or other irregular form of guard may be used if desired. It is highly desirably, however, that their contacting surfaces be of convex form.

In Figure 13, I have shown a guard which may be used by me and which is designated 18. This guard is provided with apertures 19 and is preferably corrugated by the provision of a series of panels 20.

It will be seen that I have provided a novel structure wherein the guards may have comparatively large contacting surfaces. Furthermore, these guards are of such form that they will support the eye glasses entirely from the fleshy portion of the nose. Though the guards may be amply large to preclude excessive digging into the skin of the nose, their contacting surfaces are so formed that their greatest pressure is at the center, which prevents them from shifting, while the uniformly curved surrounding surfaces grip and at the same time preclude digging into the skin. Since these devices do not rest upon the bony structure of the nose at all, no pressure is applied to this portion.

Furthermore, with my structure, the necessity for adjusting an elongated guard so as to bring it into proper contact with both the bony structure of the nose and the fleshy portion of the nose is entirely obviated. This does away with the danger of applying excessive pressure upon the fleshy portion of the nose as well as upon the bony portion of the nose. With my mounting, the guards are definitely set upon the fleshy portion of the nose and they will then hold the lenses firmly in place so that no tilting of the lenses or other displacement of the mounting upon the nose can occur under normal conditions. Ample pressure can be maintained by my guards because of the size and shape of these guards and their location upon the nose.

It will furthermore be apparent that I have provided a guard which requires no adjustment within itself, because no attempt is made to fit the contour of the contacting surface of the guard to the nose. The adjustment is solely in the arm and the convex surface of uniform contour insures that the guard will always exert the same pressure against the nose, regardless of the position which may be assumed by such guard.

The term "guards" as used in the claims is intended to describe those elements which are carried by the mounting and which perform the entire function of supporting the mounting upon the nose. This term is intended to distinguish from those elements which are sometimes carried by the guards and cooperate with parts thereof to support the mounting from the nose or which are sometimes used to cooperate with the bridge for supporting the mounting from the nose, these last elements being ordinarily termed "pads" but being sometimes erroneously called "guards".

It will be understood that my invention is applicable to practically all type of opthalmic lens mountings. It is applicable to zylonite structures as well as to other structures. With the zylonite structure, the guards themselves may be entirely of zylonite or the contacting surfaces thereof may be of zylonite.

Having thus described my invention, what I claim is:

1. A mounting for ophthalmic lenses comprising a pair of guards, and arms connected at one end to said guards and having their opposite ends connected to the mounting substantially at the horizontal center of the lenses, said arms extending inwardly to a point above said horizontal center of the lenses, and being mounted at such a level on the mounting that the centers of the guards are above said horizontal center to position the guards with their nose contacting areas in contact with the upper structure of the nose immediately beneath the eyebrow and above the point where the nose starts to widen while such arms do not contact with the nose, each of said guards having that side thereof which faces the nose sufficiently small so that it will not project downwardly onto the bony structure of the nose, and made of non-yielding material of smooth convex form with its highest point in the center and with its surrounding area of uniform curvature throughout, such curvature being sufficiently gradual to prevent such highest portion from digging into the nose to an excessive extent and to prevent the edges thereof from digging into the nose to an excessive extent.

2. A mounting for ophthalmic lenses comprising a pair of guards, and arms connected at one end to said guards and having their opposite ends connected to the mounting substantially at the horizontal center of the lenses, said arms being mounted at such a level on the mounting and extending inwardly and upwardly in such direction as to position the guards with their nose contacting areas in contact with the upper structure of the nose immediately beneath the eyebrow and above the point where the nose starts to widen while such arms do not contact with the nose, each of said guards having that side thereof which faces the nose substantially circular in form and sufficiently small so that it will not project downwardly onto the bony structure of the nose, and made of non-yielding material of smooth convex form with its highest point in the center and with its surrounding area of uniform curvature throughout, such curvature being sufficiently gradual to prevent such highest portion from digging into the nose to an excessive extent and to prevent the edges thereof from digging into the nose to an excessive extent.

3. A mounting for ophthalmic lenses comprising a pair of guards, and arms connected at one end to said guards and having their opposite ends connected to the mounting substantially at the horizontal center of the lenses, said arms being mounted at such a level on the mounting and extending inwardly and upwardly in such direction as to position the guards with their nose contacting areas in contact with the upper structure of the nose immediately beneath the eyebrow and above the bony structure of the nose while such arms do not contact with the nose, each of said guards having a nose contacting area sufficiently small that it will not project downwardly onto said bony structure of the nose, said nose contacting area being made of non-yielding material and of convex form with its highest point in the center and with a surrounding area of uniform curvature sufficiently gradual to prevent such highest point from digging into the nose to an excessive extent, the connections between each guard and arm comprising a rocking joint to thereby permit such guards to automatically adjust themselves to the inclination of the nose.

4. A mounting for ophthalmic lenses comprising a pair of guards, and arms connected at one end to said guards and having their opposite ends connected to the mounting substantially at the horizontal center of the lenses, said arms being mounted at such a level on the mounting and extending inwardly and upwardly in such direction as to position the guards with their nose contacting areas in contact with the upper structure of the nose immediately beneath the eyebrow and above the bony structure of the nose while such arms do not contact with the nose, each of said guards having a nose contacting area sufficiently small that it will not project downwardly onto said bony structure of the nose, said nose contacting area being made of non-yielding material and of convex form with its highest point in the center and with a surrounding area of uniform curvature sufficiently gradual to prevent such highest point from digging into the nose to an excessive extent, the connections between each guard and arm comprising a universal joint to thereby permit such guards to automatically adjust themselves to the inclination of the nose.

In testimony whereof I affix my signature.

GEORGE A. SQUIER.